United States Patent [19]

DeMarco

[11] 4,165,400

[45] Aug. 21, 1979

[54] SELF-EMULSIFYING ANAEROBIC COMPOSITION

[75] Inventor: JoAnn DeMarco, Southington, Conn.

[73] Assignee: Loctite Corporation, Newington, Conn.

[21] Appl. No.: 834,593

[22] Filed: Sep. 19, 1977

Related U.S. Application Data

[62] Division of Ser. No. 697,165, Jun. 17, 1976, Pat. No. 4,069,378.

[51] Int. Cl.$^2$ ........................... B05D 3/00; B05D 3/02
[52] U.S. Cl. ..................................... 427/295; 427/353; 427/385 C; 427/388 A; 427/393; 427/297
[58] Field of Search ............... 427/354, 388 A, 385 C, 427/393, 295, 353, 297; 428/463, 500; 526/209, 225, 295, 320, 328

[56] References Cited

U.S. PATENT DOCUMENTS

| | | | |
|---|---|---|---|
| 3,672,942 | 6/1972 | Newmann et al. | 427/295 |
| 3,795,641 | 3/1974 | Lees et al. | 526/217 |
| 3,969,552 | 7/1976 | Malotsky et al. | 427/295 |
| 3,985,943 | 10/1976 | Gruber et al. | 526/328 |
| 4,069,378 | 1/1978 | DeMarco | 427/354 X |

*Primary Examiner*—Michael R. Lusignan
*Attorney, Agent, or Firm*—Jean B. Mauro

[57] ABSTRACT

A self-emulsifying anaerobic-curing composition is disclosed. The composition is rendered self-emulsifying by incorporating certain anionic and/or nonionic surfactants in a concentration range of about 0.25 to about 10.0 percent. The preferred anionics comprise the petroleum sulfonates and the sodium alkyl or alkylaryl sulfonates. The preferred nonionics comprise the ethoxylated alkyl alcohols, the ethoxylated alkyl phenols, and the polyoxyethylene/polyoxypropylene glycols. Any anaerobic monomer or monomer mixture in which the surfactant is soluble and compatible with the cure system may be used. These self-emulsifiable compositions have the advantage of being readily removed from surfaces by washing with water, which makes them especially useful in impregnation processes where uncured resin must be removed from areas which are difficult to wash, such as small, blind holes.

5 Claims, No Drawings

SELF-EMULSIFYING ANAEROBIC COMPOSITION

This is a division of application Ser. No. 697,165, filed June 17, 1976, now U.S. Pat. No. 4,069,378, patented Jan. 17, 1978.

BACKGROUND OF THE INVENTION

Porous articles, and particularly porous metal articles such as castings and sintered metal parts, frequently must be sealed and impregnated (for simplicity, hereinafter generally referred to jointly as "sealed") before use. This is necessary to make the article capable of withstanding liquid or gas pressure during use, and also to increase its density, improve its strength, reduce corrosion, and frequently to prepare the surface of the article for a subsequent painting or plating operation. A wide variety of porous metal articles are used commercially today, and are manufactured from a wide variety of metals. Zinc, copper, brass, iron, aluminum, magnesium and various alloys are among the common metals needing to be sealed. Other important materials which frequently need to be sealed are wood and ceramics.

The prior art has recognized the need to seal these articles for many years. The earliest sealing process generally involved the use of either an inorganic sealant, such as sodium silicate, or a natural organic substance such as varnish. In more recent years, substances such as unsaturated alkyds, epoxides, and various other unsaturated monomers such as diallyl phthalate have been used. See, for example, U.S. Pat. No. 3,345,205 to Raech, issued Oct. 3, 1967; U.S. Pat. No. 2,932,583 to Grana, issued Apr. 12, 1960; and U.S. Pat. No. 2,554,254 to Kroft, issued May 22, 1951.

A substantially improved process for impregnating porous articles is taught by U.S. Pat. No. 3,672,942 to Neumann and Borowski, issued June 27, 1972, (the disclosure of which is incorporated herein by reference), which relates to impregnation with polymerizable anaerobic monomers, followed by surface treatment of the impregnated article with an organic solvent solution of an accelerator.

A major draw-back of the prior art systems is their need for organic solvent treatment to remove excess impregnant remaining on the surface of the article prior to cure, i.e., polymerization, of the impregnant. Use of solvents, of course, involves economic, toxicological and ecological disadvantages, for which reasons the search for aqueous-based substitutes has been vigorously pursued. Recent commercial systems have employed styrene-based polyester monomer impregnants which can be washed off the surface of articles by aqueous surfactant solutions; however, these monomers are not anaerobic and thus do not provide the substantial benefits associated with anaerobic impregnants, and the surfactant solutions must be used at elevated temperatures, e.g., about 150° F. or higher, and for relatively long treatment times.

In copending application Ser. No. 467,989, filed May 8, 1974, now U.S. Pat. No. 3,969,552, patented July 13, 1976, to Frauenglass et al., there is disclosed an anaerobic impregnation process which advances the art by providing a surfactant-containing aqueous rinse which, for the first time, permitted use of an aqueous rinse with anaerobic monomers, which are quite water-insoluble. In practice, however, the Frauenglass et al. process is still not fully satisfactory for all uses. More specifically, that process does not remove well the excess anaerobic impregnant from the surface of very small areas which are not adequately reached by ordinary agitation. Typical of these difficult areas are small blind holes, e.g., about one millimeter or less in diameter and about 1 to 3 millimeters or more in depth, such as occur frequently in complex castings such as carburetors. An anaerobic impregnation composition which is inherently capable of being readily removed from such difficult areas by a simple aqueous rinse would be of great benefit to the impregnation industry.

It has now been found that anaerobic monomers suitable for impregnation may be rendered easily removable by incorporating in the monomer composition a surfactant of this invention. By so doing, the monomers are made self-emulsifiable upon contact with water, which greatly enhances the ability of plain water to rinse away surface deposits of anaerobic monomers from such troublesome areas as small blind holes.

SUMMARY OF THE INVENTION

According to the present invention, there is provided an anaerobic curing composition which is self-emulsifiable upon mixing with water, comprising:

(a) anaerobically curing monomer systems, as described herein;

(b) a free radical, e.g., peroxy initiator in sufficient concentration to initiate cure of the monomer upon exclusion of oxygen; and (c) about 0.25 to about 10.0 percent by weight of the total composition of an anionic or nonionic surfactant, or mixtures thereof, which is dissolved in the composition and which renders the composition self-emulsifying upon mixing with water.

Preferably the surfactant concentration will be about 0.5 to about 5 percent, and more preferably about 1.0 to about 2.5 percent, by weight of the total composition.

The useful surfactants are taken from the anionic and nonionic classes, and mixtures thereof. Mixtures of surfactants within a class may also be used. The surfactant must be soluble in the anaerobic composition at room temperature and should not contain any functional groups, impurities, and the like, which significantly interfere with the stability or cure of the anaerobic monomer or its cured properties. Aside from these general requirements, selection of a suitable surfactant or surfactants is a matter of choice based upon routine experimentation. The particular test methods described herein may be advantageously used to facilitate selection.

The preferred polymerizable anaerobic monomers conform to the formula

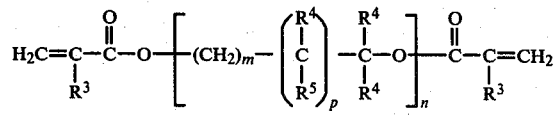

wherein $R^3$, $R^4$, $R^5$, m, n, and p are as hereinafter defined. However, there is no inherent reason why other known anaerobic monomers could not also be used, provided they are capable of dissolving the surfactant. For example, the methane-acrylate monomers taught by U.S. Pat. No. 3,425,988 can be used.

Obviously, the invention may be utilized whenever it is desired that a polymerizable anaerobic monomer liquid be readily removable from surfaces which will not be damaged by contact with water. While not limited to impregnation, the invention is particularly advantageous when incorporated into an impregnation process as a means of removing excess or residual anaerobic monomer from the surface of impregnated porous articles. As a matter of convenience, therefore, the invention will be described in terms of an impregnation process. Thus, specifically, the present invention contemplates, in its preferred aspect, the use of the present composition as the monomer composition in an anaerobic impregnation process. The invention also contemplates an impregnation or sealing process at least one step of which involves removing at least a portion of the sealant from the surface of a porous article by treating the surface with plain water or with an aqueous solution, as in the Frauenglass et al. application, above cited.

DETAILED DESCRIPTION OF THE INVENTION

As is well known in the art, in anaerobic compositions, oxygen serves to inhibit the polymerization of the monomers, thus making it possible to catalyze them well in advance of the time of intended use. As long as the monomer-catalyst mixture is properly exposed to oxygen, polymerization will not take place for extended periods of time, typically several months and in many cases for more than a year. However, under anaerobic (essentially oxygen free) conditions, the delicate balance between initiation and inhibition of polymerization is destroyed and the composition will cure. In an impregnation process, anaerobic conditions are reached within the pores of the porous metal parts but not at the surface of the parts, thus leaving a film of uncured monomer at the surface. The monomer of the present invention, being readily removable by water washing, leaves the surface free of residual monomer and receptive to further processing.

A considerable number of anaerobic monomers are known. These materials characteristically contain acrylate or substituted acrylate (e.g., methacrylate) endgroups. Any such anaerobic monomer composition can be rendered self-emulsifiable to at least some extent by utilizing the surfactants as disclosed herein. However, not all anaerobic monomer compositions are useful in, e.g., an impregnation process. In the latter process the monomer should be selected to have favorable viscosity properties to permit ready penetration into the microporosity of a casting to be sealed. Of course, reactivity, viscosity drinkage, and other properties can be adjusted by use of diluents, e.g., reactive diluents such as hydroxyethyl methacrylate, lauryl methacrylate, triethylene glycol dimethacrylate, and the like, thereby greatly broadening the useful types of monomers. Viscosity requirements for impregnation use are discussed more fully below.

Preferably at least a portion of the acrylate monomer is a di- or other polyacrylate ester. These polyfunctional monomers produce cross-linked polymers, which serve as more effective and more durable sealants.

While various anaerobic curing acrylate monomers may be used, as already mentioned, preferred are polyacrylate esters which have the following general formula:

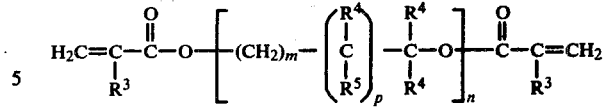

wherein $R^4$ represents a radical selected from the group consisting of hydrogen, lower alkyl of from 1 to about 4 carbon atoms, hydroxy alkyl of from 1 to about 4 carbon atoms, and

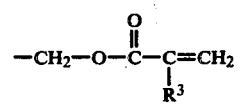

$R^3$ is a radical selected from the group consisting of hydrogen, halogen, and lower alkyl of from 1 to about 4 carbon atoms; $R^5$ is a radical selected from the group consisting of hydrogen, hydroxyl, and

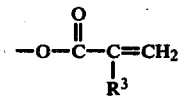

m may be 0 to about 12, and preferably from 0 to about 6; n is equal to at least 1, e.g., 1 to about 20 or more, and preferably between about 2 and about 6; and p is 0 or 1.

The polymerizable polyacrylate esters corresponding to the above general formula are exemplified by, but not restricted to, the following materials: di-, tri- and tetra-ethyleneglycol dimethacrylate; dipropyleneglycol dimethacrylate; polyethyleneglycol dimethacrylate; di(-pentamethyleneglycol) dimethacrylate; tetraethyleneglycol diacrylate; tetraethyleneglycol di(chloroacrylate); diglycerol diacrylate; diglycerol tetramethacrylate; tetramethylene dimethacrylate; ethylene dimethacrylate; and neopentylglycol diacrylate.

While polyacrylate esters, especially the polyacrylate esters described in the preceding paragraphs, have been found particularly desirable, monofunctional acrylate esters (esters containing one acrylate group) also may be used.

The most common of these monofunctional esters are the alkyl esters such as methyl methacrylate, ethyl methacrylate, propyl methacrylate and isobutyl methacrylate. Many of the lower molecular weight alkyl esters are quite volatile and frequently it is more desirable to use a higher molecular weight homolog, such as decyl methacrylate or dodecyl methacrylate.

When dealing with monofunctional acrylate esters, it is preferable to use an ester which has a relatively polar alcoholic moiety. Such materials are less volatile than low molecular weight alkyl esters and, in addition, the polar group tends to provide intermolecular attraction in the cured polymer, thus producing a more durable seal. Most preferably the polar group is selected from the group consisting of labile hydrogen, heterocyclic ring, hydroxy, amino, cyano, and halogen polar groups. Typical examples of compounds within this category are cyclohexylmethacrylate, tetrahydrofurfuryl methacrylate, hydroxyethyl acrylate, hydroxypropyl methacrylate, t-butylaminoethyl methacrylate, cyanoethylacrylate, and chloroethyl methacrylate.

Other acrylates, such as ethoxylated bisphenol-A dimethacrylate, related compounds and their derivatives, can also be used. However, when such other acrylates are used, they often are used in combination with one or more members from either or both of the above-described classes of acrylate monomers. Most preferably, polyacrylates having the chemical formula given above, comprise at least a portion, preferably at least about fifty percent by weight of the acrylates used since these monomers have been found clearly superior in many anaerobic adhesive and sealant applications.

The anaerobic composition viscosity should be from about 1 to about 1000 centipoises and preferably is between about 5 and 500 centipoises. The most highly preferred range is from about 5 to about 150 centipoises. Viscosities higher than those indicated tend to reduce the ease of emulsification; viscosities lower than those indicated are impractical to obtain because of the inherent characteristics of the monomers. It should be recognized, however, that in certain adhesive and sealing situations where relatively large gaps are to be closed and relative slowness of emulsification can be tolerated, much higher viscosity sealants (e.g., 10,000–100,000 centipoises) may be tolerable. Surface tension of the anaerobic composition also can affect these characteristics. The ideal emulsifiability for any anaerobic composition will be a function of its viscosity, surface tension, the particular surfactant to be used, and the pore size of the porous part to be impregnated, and the like, and can be determined easily with a minimum of routine tests.

The monomers described above are given anaerobic characteristics by incorporating therein an appropriate polymerization initiator system. The initiator must be capable of inducing polymerization of the monomer or monomers in the substantial absence of oxygen, and yet not induce polymerization as long as oxygen is present. Since the unsaturated monomers used in this invention are conveniently cured through a free-radical mechanism, the most common initiator system is a redox polymerization initiator, i.e., an ingredient or a combination of ingredients which produce an oxidation-reduction reaction, resulting in the production of free radicals. The most common initiator systems of this type are those involving peroxy materials which, under the appropriate conditions, decompose to form peroxy free radicals.

A class of peroxy initiators which has been found readily adaptable to the anaerobic concept, and particularly efficient when used in combination with the acrylate monomers described above, is the hydroperoxy initiators. Of this class, the organic hydroperoxides are the most preferred. Cumene hydroperoxide has been used with particular success. Inorganic peroxides and compounds such as peresters which decompose to form free radicals are also useful. Thus, as used herein, the term "peroxy" is intended to mean peroxides, hydroperoxides and peresters which are suitable for preparing anaerobically curing monomer systems.

For purposes of versatility, it frequently is desirable to incorporate in the composition various additives, for example, various classes of accelerators of hydroperoxide decomposition. Typical examples are tertiary amines such as tributyl amine, sulfimides such as benzoic sulfimide, formamide, and compounds containing transition metals, such as copper octanoate.

While the amount of redox polymerization initiator in the composition can vary over wide ranges, it is usually impractical for such an initiator to comprise more than about 10 percent by weight of the composition, and it preferably does not comprise more than about 5 percent of the composition by weight. Most preferably the redox polymerization initiator comprises from about 0.2 percent to about 3 percent by weight of the composition. The weight percent of the redox polymerization initiator should not be allowed to decrease below about 0.1 percent, since below that level the cure will be unduly slow.

Frequently it may be desirable to add one or more comonomers to the acrylate system, e.g., to modify the viscosity, solvent resistance, or other characteristics of the cured or uncured composition. While a mixture of acrylates often can be used successfully, other unsaturated comonomers can be used as well. These comonomers generally will be monomers capable of relatively rapid vinyl-type polymerization so that they can copolymerize, at least to a limited extent, with the reactive acrylate monomers. For example, alkyd resins such as (dimethyldiphenyl methane)fumarate and diethyleneglycol maleate phthalate, and other unsaturated monomers such as diallyl phthalate and dimethyl itaconate can be used successfully. Likewise, prepolymers of the above-named comonomers up to about molecular weight 3000 can be used.

When non-acrylate comonomers are used, they preferably should not be used in amounts which exceed about 50 percent of the total weight of the acrylate monomer in the system. Other ingredients can be added as well, provided they do not adversely affect the sealing function of the composition or interfere substantially with the emulsifiability of the sealant in the formulations of this invention.

In an impregnation process, the sealant composition described above cures under the anaerobic conditions of the interior of the article to form a hard, durable resin. However, at the surface of the article there is sufficient contact with oxygen to leave a thin film of the impregnant in the uncured, or more likely, partially cured state. This film is undesirable since the uncured impregnant can contaminate its surroundings upon removal by normal abrasion or by various liquids. More important, this film tends to interfere with the subsequent painting, plating or assembly operations which frequently are performed upon the metal articles, and generally will be removed during the painting or plating operations and will contaminate any painting or plating baths which are used. As already mentioned, this residue in critical areas, which are not easily reached by normal agitation during rinsing, is especially troublesome.

Whereas the prior art processes utilize organic solvents or surfactant solutions to remove this residual uncured sealant, the present self-emulsifying compositions are readily removed by washing with water alone. The prior art processes depend for their effectiveness on the diffusion rate of the solvent or aqueous surfactant rinse into the anaerobic monomer composition and likewise on the diffusion rate of the monomer composition into the rinse liquid, as well as upon the solubility of the monomer compositon in the rinse liquid. In contrast, the present compositions are not diffusion-limited since they have the capacity to emulsify themselves upon contact with water and thereby essentially "float" themselves off the surface of an article. A particularly advantageous property of the present compositions is their ability to be washed out of very small blind holes (e.g., 1 mm or less) but yet not be washed out of tiny cracks and microscopic pores in a metal casting. The present compositions are prepared by dissolving a surfactant of this invention in the anaerobic monomer composition. By "anaerobic monomer composition" is meant a total composition apart from the surfactant, including the acrylate monomer, any diluents (reactive or otherwise), the initiator, and any optional ingredients, such as accelerators, viscosity modifiers, inhibitors, etc.

The surfactant concentration will depend in any given case upon the particular surfactant and anaerobic monomer composition being used. Optimization will be a matter of routine experimentation within the skill of the art. Ordinarily, however, a minimum concentration of about 0.25 percent surfactant by weight of the total composition will be needed to achieve an acceptable degree of emulsifiability, and a concentration of at least about 0.5 percent will usually be preferred. The maximum surfactant concentration will usually be about 10 percent since above this level the surfactant may begin to interfere with the properties of the anaerobic monomer composition by adversely affecting, for example, its cure rate, stability or cured properties. As a practical matter, an upper concentration limit of about 5 percent, is usually satisfactory. For most surfactants or combinations of surfactants, the optimum concentration will probably fall in the range of about 1.0 to 2.5 percent by weight of the total composition.

Just as an excessive concentration of surfactant may cause interference with the performance of the anaerobic monomer composition, the surfactant also should not contain any functional groups, impurities, and the like, which have a deleterious effect on performance. Determination of such effect is ordinarily merely a matter of simple experimentation. As a general rule, however, it may be pointed out that cationic surfactants should be avoided since they tend to be incompatible with the typically acidic anaerobic cure system. For instance, benzoic sulfimide, a very commonly used accelerator of anaerobic polymerization, tends to be precipitated by cationic surfactants. Similarly, highly acidic or highly basic surfactants should be avoided since they tend to be incompatible with the hydroperoxide initiators commonly used in anaerobic systems. Hindered phenolic and quinoid-type surfactants should also be avoided since they tend to increase the stability of the anaerobic monomer composition, thereby interfering with its cure characteristics.

Provided that all the above-mentioned functional limitations are met, any anionic or nonionic surfactant, or mixture thereof, can be used to form the self-emulsifiable compositions of this invention.

Illustrative, but in no way limiting, of the useful anionic surfactants are the petroleum sulfonates having the formula $(C_nH_{2n-10}SO_3)_x Me$ wherein n is more than 20 and Me is a metal of valence x. Such materials are sold by, among others, Witco Chemical Corp., New York, New York, under the trademark "Alconate" 80, and by the Penreco Division of Penzoil, Butler, Pennsylvania, under the trademark "Petrobase."

Another suitable anionic type comprises the sodium alkyl or alkylaryl sulfonates having the formula

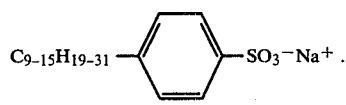

Such materials are sold by E. I. du Pont de Nemours & Co., Wilmington, Delaware, under the trademarks "Alkanol" 189-S and "DW" and the trademark "Duponol," and by Union Carbide Corp., New York, New York, under the trademark "Tergitol" (numerical series).

Still another useful anionic class is the sulfonated ethoxylated types sold as the "Alipal" series by GAF Corp., New York, New York, and as "Neodol" 25-35 by Shell Chemical Co., Houston, Texas.

Among the nonionic surfactant's there may be mentioned the ethoxylated alcohols including, e.g., the linear secondary alcohols having the formula

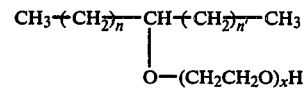

wherein either n or n' may be zero and the sum of n plus n' is from 1 to about 40, and x is about 5 to about 100; and the linear primary alcohols of the formula

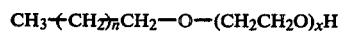

wherein n is 0 to about 40 and x is about 5 to about 100. Such compounds are sold as "Alfonic" 1012 and 1412 series by Conoco Chemicals, Saddle Brook, New Jersey; as "Siponic" CD, L & E series by Alcolac, Inc., Baltimore, Maryland; as "Lipal" by PVO International, Inc., Boonton, New Jersey; as "Tergitol" S series by Union Carbide Corp., New York, New York; as "Neodol" 23, 25 and 45 series by Shell Chemical Co., Houston, Texas; as "Ameroxol" OE series by Amerchol, Edison, New Jersey; and as "Carboxane" LO, O and TW series by Textilana Corp., Hawthorne, California.

Another class of useful nonionic surfactants is the ethoxylated alkyl (linear or branched) phenols. These typically have the formula

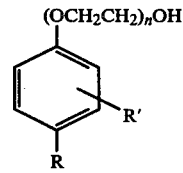

wherein n is about 4 to 100, R is a linear or branched alkyl having about 4 to 20 carbon atoms, and R' is R" or H wherein R" is R or other linear or branched alkyl group. These compounds are sold under such trademarks as "Igepal" CA and CO series by GAF Corp., New York, New York; as "T-Det" N and DD series by Thompson-Hayward Chemical Co., Kansas City, Kansas; as "Surfonic" N and DNP series by Jefferson Chemical Co., Austin, Texas; as "Tergitol" NP by Union Carbide Corp., New York, New York; as "Renex" 600 series by ICI United States, Wilmington, Delaware; and as certain of the "Triton" X series by Rohm & Haas Co., Philadelphia, Pennsylvania.

Still another useful class of nonionic surfactants is the polyoxyethylene/polyoxypropylene glycols having the formula

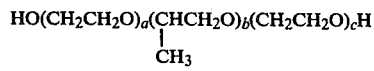

wherein a, b and c are integers such that the molecular weight of the compound is in the range of about 500 to about 30,000, and units a plus c comprise about 10 to 80 percent by weight of the final molecular weight. Such compounds are sold by BASF Wyandotte, Wyandotte, Michigan, under the trademark "Pluronic."

As has been mentioned, mixtures of suitable surfactants may also be used. Such mixtures may be prepared by the user or are available commercially under such trademarks as "T-Mulz" from Thompson-Hayward Chemical Co., Kansas City, Kansas; as "Atlox" series from ICI United States, Wilmington, Delaware; as "Carsofoam" from Carson Chemical Co., Long Beach, California; and as certain of the "Triton" X series from Rohm & Haas Co., Philadelphia, Pennsylvania.

It will be appreciated that the above-mentioned surfactants are merely representative of the useful anionic and nonionic types available and are not intended to comprise an inclusive list.

Selection of suitable surfactants is a matter of simple experimentation. As has been stated, the first requirement is that the surfactant be soluble in the monomer composition. This obviously can be quite readily determined for any concentration contemplated.

The second requirement is that the surfactant not have any significant adverse effect on the functional properties of the anaerobic monomer composition. Any adverse effect on stability can be readily determined by storing the solution of the surfactant in the anaerobic monomer composition for an appropriate period of time, e.g., several hours to several weeks, depending on the particular application intended, and observing whether the composition gels or a precipitate forms. Deleterious effect on cure properties can be ascertained easily by subjecting the composition to any of various well-known cure property tests. Such tests include assembling metal or glass lap shear strips or nuts and bolts and measuring the time required for the composition to "fixture," i.e., cure to the extent that the parts become immobile in relation to each other. Depending on the composition involved, a matter of only a few minutes or hours are involved. Appropriate tests for stability and cure properties are well described in the art, e.g., U.S. Pat. No. 3,218,305, among others.

To assist further in screening candidate surfactants, two simple tests have been developed: an emulsifiability test for gross screening, and a capillary tube test for predicting specific performance. While the latter test can be used alone, it is somewhat more tedious and time-consuming. It is suggested, therefore, that the emulsifiability test be used initially to screen out unsuitable candidate surfactants. It has been found that a surfactant which does not perform adequately in the emulsifiability test will not be suitable in use. However, it has also been found that a surfactant which does perform adequately still may not be entirely satisfactory in use; thus, such surfactant should also be given the capillary tube test. A surfactant which performs adequately in the capillary tube test will almost certainly be satisfactory in use, provided, of course, that the other requirements already noted are also met.

The emulsifiability test is run as follows:

To 50 ml of water in a 4-ounce clear glass bottle, Boston Round shape, is added 1 ml of test material. The material may be first colored blue with an oil-soluble dye to facilitate observation. The bottle is capped and shaken for approximately 5–10 seconds. The quality and stability of the resultant emulsion or mixture are observed over a suitable period of time (5 min.-60 min.). Poor results are indicated by large resin droplets and rapid "oiling out" (original material separates as layer) of the test material, which is the result of inadequate emulsification. Good to excellent results are indicated by formation of very small, well-dispersed droplets and a reasonably stable emulsion.

The capillary tube test is run as follows:

A one-inch piece of thin-wall glass capillary tube, one millimeter diameter, is filled with the test solution, optionally dyed blue. The tube is then gently placed horizontally into a 250 ml beaker containing approximately 100 ml plain water. The time required for the test material to completely exude from the tube without agitation is observed. Good results occur when this time is 3–5 minutes; fair: 5–15 minutes;; poor: greater than 15 minutes.

A particular advantage of these self-emulsifying compositions is that their benefit may be utilized by room temperature treatment with water. However, warm or even hot temperatures may be used if desired. In addition, an aqueous surfactant wash may optionally be used instead of plain water.

Washing of articles having the self-emulsifying impregnant on their surface may be performed by any convenient method. For example, the articles may be placed on racks and sprayed with water. The most desirable method of treatment is by dipping the articles into a tank containing the wash water. Preferably, the tank will be moderately agitated, although it is an advantage of this invention that extreme agitation is not required. Length of the treatment need only be such as will provide adequate removal of the anaerobic monomer composition and may be readily determined by simple experimentation for various combinations of monomer, surfactant, concentration and agitation. In the great majority of cases, the treatment time will be less than 10, typically less than 5, minutes.

A typical prior art process for impregnation of porous metal articles with a polymerizable anaerobic sealant will comprise the basic sequential steps of cleaning and degreasing the articles, impregnating them with the anaerobic sealant containing a peroxy initiator, followed by organic solvent rinse to remove excess surface sealant and leave the surface free of sealant. The organic solvent aspect of this latter step is now obviated by the self-emulsifiable sealant and aqueous rinse of the present invention. Other steps may also be included in the impregnation process, such as the aeration step and the polymerization accelerator solution rinse taught by U.S. Pat. No. 3,672,942, previously cited. In particular, this invention is useful in the process for sealing porous rigid articles which comprises:

(a) preparing an anaerobic sealant comprising a polymerizable acrylate ester monomer, a hydroperoxide polymerization initiator therefor, and a surfactant of this invention;

(b) accelerating and aerating the sealant in a vacuum vessel at a sufficient rate to prevent polymerization of the anaerobic sealant;

(c) submerging porous rigid articles to be sealed in the anaerobic sealant;

(d) discontinuing the aeration and drawing a vacuum in the vessel of less than about five inches of mercury absolute pressure;

(e) after the interstices of the article have been evacuated, releasing the vacuum to force the anaerobic sealant into the interstices;

(f) removing the impregnated article from the anaerobic sealant and treating the surfaces of the article with an aqueous rinse; and (g) treating the surfaces of the article with a solvent or aqueous solution of an accelerator selected from the group consisting of the following classes: aldehyde-amine condensation products; sulfur-containing free-radical accelerators; and organic compounds containing an oxidizable transition metal.

EXAMPLES

The following examples illustrate the invention but are not intended to limit it in any way. All formulations are given on a weight basis based on the weight of the total composition.

EXAMPLE 1

Various anionic, nonionic, and commercially available mixtures thereof were mixed at the 2 percent and 4 to 5 percent concentration levels into the following anaerobic monomer composition:

| | |
|---|---|
| Triethyleneglycol dimethacrylate | 70 parts |
| Lauryl methacrylate (diluent) | 26 parts |
| Cumene hydroperoxide | 2 parts |
| Accelerator, inhibitors, dye | 2 parts (approx.) |

All the surfactants were found to be soluble, upon mild agitation, in the anaerobic monomer composition.

The total compositions so prepared were tested using the capillary tube test. Results are shown in Table I. For purposes of comparison, the results of the emulsifiability test are also shown.

mately 0.3 percent benzoic sulfimide. Approximately 20 gallons of this mixture is transferred to a vacuum tank (approx. 10 cu. ft.) equipped with flexible connections to a vacuum pump. A one-quarter inch polyethylene aeration line is connected from the bottom of the tank to an air compressor. Aeration is commenced upon transfer of the impregnant to the tank, air being supplied at a pressure of 6 p.s.i.g. About 3 parts per million by weight copper (as copper octanoate) is added.

To test the stability of the impregnant, aeration is continued for approximately two days during which time the anaerobic mixture remains liquid. No significant change in viscosity is noticed, indicating the absence of any significant amount of polymerization.

The mixture is then used to impregnate die-cast aluminum parts containing a number of small (1 mm diameter, 2 mm deep) blind holes. Prior to impregnation, the aluminum parts are water-washed and vapor phase-degreased to insure cleanliness. The cleaned parts are placed in a stainless steel rack and suspended in the impregnation tank with the parts completely submerged in the impregnant. The tank is closed, sealed, and the air is evacuated by means of the vacuum pump.

An absolute pressure of approximately one inch of mercury is reached in less than two minutes, and this vacuum is maintained for about ten minutes. Thereafter the vacuum pump is turned off and the pressure in the tank gradually increased by means of a bleed valve. After the pressure has reached atmospheric pressure, the tank is opened and the tray of impregnated parts is removed from the liquid and allowed to drain for about five minutes. The tray then is submerged in water at room temperature. After about 5 minutes with slight

TABLE I

CAPILLARY TUBE TEST RESULTS

| Surfactant | | | Emulsifiability | Minutes to Exude from tube | |
|---|---|---|---|---|---|
| Type | Tradename | Structure | Test Rating | 2% | 4-5% |
| 1 nonionic | Ameroxol OE10 | ethoxylated oleyl alcohol, 10EO | G | <3 | 3-5 |
| 2 nonionic | Ameroxol OE20 | ethoxylated oleyl alcohol, 20EO | G | <3 | <3 |
| 3 nonionic | Carboxane L09 | linear alcohol ethoxylate, 90% | G | 3-5 | <3 |
| 4 nonionic | Carboxane 09 | linear alcohol ethoxylate | G | <3 | 3-5 |
| 5 nonionic | Carboxane TW100 | alcohol ethoxylate | G | >15 | 3-5 |
| 6 nonionic | Altonic 1012-60 | ethoxylated decyl alcohol, 5EO | * | >15 | 10-15 |
| 7 nonionic | Tergitol 15-S-9 | ethoxylated linear $C_{11}$-$C_{15}$ alcohol, 9EO | G | >15 | <3 |
| 8 nonionic | Triton X100 | ethoxylated iso-octyl alcohol, 9-10EO | G | >15 | >15 |
| 9 nonionic | Igepal CO 730 | ethoxylated monyl phenol, 15EO | * | <3 | <3 |
| 10 nonionic | Pluronic L64 | polyoxypropylene/polyoxyethylene | * | <3 | <3 |
| 11 nonionic | Surfactol 365 | ethoxylated caster oil | G | >15 | >15 |
| 12 nonionic | Amerchol L101 | multisterol lanolin extract | P | >15 | >15 |
| 13 nonionic | Carboxane 863 | fatty polyethoxy ester | G | >15 | >15 |
| 14 nonionic | Alkamide CL55 | modified lauric alkanolamide | F | >15 | >15 |
| 15 anionic | Base 11-T | alkyl petroleum sulfonate | G | 5-10 | >15 |
| 16 anionic | Alconate 80 | petroleum sulfonate mw 410/420 | G | >15 | 3-5 |
| 17 anionic | Alkanol DW | sodium alkylaryl sulfonate | G | 3-5 | 5-10 |
| 18 nonionic/anionic | Triton X152 | alkylarylpolyether alcohol + organic sulfonate | F | >15 | 3-5 |
| 19 nonionic/anionic | Triton X172 | alkylarylpolyether alcohol + organic sulfonate | F | 10-15 | 5-10 |

*not tested

EXAMPLE 2

This example illustrates the use of the self-emulsifiable compositions of this invention in an impregnation process.

A blend of acrylate monomers is prepared by mixing ⅔ by weight of triethyleneglycol dimethacrylate with ⅓ by weight lauryl methacrylate. To this mixture is added approximately 2 percent of surfactant "Carboxane" 09, about 2 percent cumene hydroperoxide, and approxiagitation, the tray is removed and is submerged in a water solution containing 2 percent thiourea (which is an accelerator of free radical polymerization). After about 30 seconds the tray is removed and the parts are allowed to stand for about six hours at room temperature to allow full hardening of the sealant to take place.

The sealed porous metal pieces are found to have a smooth, clean surface with no visible evidence of sealant on any of the outer surfaces, including the inner surfaces of the small blind holes. The sealant is found to have cured essentially to the outer surface of the castings.

EXAMPLE 3

The procedure of Example 2 is repeated except the surfactant used is "Pluronic" L64 and the accelerator is N,N'-dimethyl thiourea. Similar results are obtained.

EXAMPLE 4

The procedure of Example 2 is repeated except that the acrylate monomer is 1,3-butyleneglycol dimethacrylate. Similar results are obtained.

I claim:

1. A process for impregnating and sealing a porous article comprising the steps of:
   (a) impregnating the article with a self-emulsifiable anaerobic-curing composition which comprises:
      A. an anaerobically-curing acrylate monomer;
      B. a peroxy initiator in sufficient concentration to initiate cure of the monomer upon exclusion of oxygen; and
      C. about 0.25 to about 10.0% by weight of the total composition of an anionic or nonionic surfactant which is dissolved in the composition and which renders the composition self-emulsifying upon mixing with water;
   (b) washing the surface of the article with water; and
   (c) permitting the anaerobic sealant to cure.

2. The process of claim 1 wherein the water also contains a surfactant in solution.

3. The process of claim 1 comprising, in addition, treatment of said surface with a solution of an accelerator of the polymerization of the anaerobic sealant.

4. The process of claim 3 wherein the polymerization accelerator is selected from the group consisting of the following classes: aldehyde-amine condensation products; sulfur-containing free-radical accelerators; and organic compounds containing an oxidizable transition metal.

5. The process of claim 3 wherein the accelerator is in aqueous solution.

* * * * *

UNITED STATES PATENT OFFICE
CERTIFICATE OF CORRECTION

Patent No. 4,165,400  Dated  August 21, 1979

Inventor(s)  JOANN DEMARCO

It is certified that error appears in the above-identified patent and that said Letters Patent are hereby corrected as shown below:

At Column 3, Line 16:  Insert the word, "surfactant" after aqueous.

Signed and Sealed this

Thirty-first Day of August 1982

[SEAL]

Attest:

Attesting Officer

GERALD J. MOSSINGHOFF

Commissioner of Patents and Trademarks